(12) United States Patent
Laycock et al.

(10) Patent No.: US 9,672,153 B2
(45) Date of Patent: Jun. 6, 2017

(54) MEMORY INTERFACE CONTROL

(75) Inventors: Christopher William Laycock, Sheffield (GB); Antony John Harris, Hope Valley (GB); Arthur Laughton, Hope Valley (GB)

(73) Assignee: ARM Limited, Cambridge (GB)

( * ) Notice: Subject to any disclaimer, the term of this patent is extended or adjusted under 35 U.S.C. 154(b) by 1708 days.

(21) Appl. No.: 13/067,602

(22) Filed: Jun. 13, 2011

(65) Prior Publication Data

US 2012/0317368 A1    Dec. 13, 2012

(51) Int. Cl.
*G06F 12/00* (2006.01)
*G06F 12/0831* (2016.01)

(52) U.S. Cl.
CPC ...... *G06F 12/0835* (2013.01); *G06F 12/0831* (2013.01); *G06F 12/0833* (2013.01)

(58) Field of Classification Search
CPC .... G06F 5/16; G06F 13/1657; G06F 12/0893; G06F 12/1081; G06F 17/5045; G06F 2212/206; G06F 12/0835; G06F 13/14; G06F 13/364; G06F 13/40; G06F 12/0804; G06F 12/084; G06F 13/28; G06F 2212/1016; G06F 12/0831; G06F 12/0879; G06F 12/0888
USPC .......................................................... 711/146
See application file for complete search history.

(56) References Cited

U.S. PATENT DOCUMENTS

2009/0319707 A1 * 12/2009 Laycock et al. ............. 710/110

OTHER PUBLICATIONS

Tang et al., DMA Cache: Using On-Chip Storgage to Architecturally Separate I/O Data from CPU Data for Improving I/O Performance, 2009, IEEE 987-1-4244-5659-8/09.*
Magnusson et al., "Queue Locks on Cache Coherent Multiprocessors", 1994 *IEEE*, pp. 165-171.
Kjos et al., "Hardware Cache Coherent Input/Output", Feb. 1996 *Hewlett-Packard Journal*, pp. 1-10.

* cited by examiner

*Primary Examiner* — Reginald Bragdon
*Assistant Examiner* — Hannah A Faye-Joyner
(74) *Attorney, Agent, or Firm* — Nixon & Vanderhye P.C.

(57) ABSTRACT

A memory interface apparatus 24 is provided with first interface circuitry 28, second interface circuitry 30 and transaction control circuitry 32. The first interface circuitry receives a first write request from a transaction master 20, 22 and issues a further transaction request associated with the memory address of the first write request via the second interface circuitry to a memory system. When an indication of the completion of the further transaction has been received at the second interface circuitry, then a second write request may be issued from the second interface circuitry to the memory system to write the target data associated with the first write request. After a write response signal in respect of the second write request is received at the second interface circuitry, then an acknowledge signal RACK indicating completion of the further transaction and that the write response signal has been received may be issued from the second interface circuitry. Between issue of the further transaction and issue of the acknowledge signal snoop requests to the memory addresses concerned that arise elsewhere within the memory system may be managed and blocked.

29 Claims, 4 Drawing Sheets

MEMORY INTERFACE CONTROL

BACKGROUND OF THE INVENTION

Field of the Invention

This invention relates to the field of data processing systems. More particularly, this invention relates to the control of the memory interface within a data processing system.

Description of the Prior Art

It is known to provide data processing systems formed of a plurality of memory transaction masters communicating via interconnect circuitry. This is a popular form of design for system-on-chip integrated circuits. The interconnect circuitry can have a variety of forms and may, for example, be built in accordance with the AXI protocol developed by ARM Limited of Cambridge, England.

In order to increase processing performance it is known to provide transaction master circuitry, such as processor cores, with local cache memories which are coupled to a main memory via the interconnect circuitry. While this approach increases performance by permitting the processors quicker access to data stored within their local cache memory, it introduces the difficulty that coherency must be managed and controlled between the cache memories and the main memory. For example, two different cache memories may store a local copy of data held within the main memory. If the copy of the data stored within one of the cache memories is updated, then an access to the data within another of the cache memories, or within the main memory, could produce an out-of-date result. In order to deal with these difficulties, it is known to provide coherency control mechanisms within such systems. Typically these coherency control mechanisms issue snoop requests when a memory access is made. These snoop requests are issued to the other places within the memory system where a copy of that same data may be held. The snoop requests determine whether or not a more up-to-date version of that data exists elsewhere, as well as controlling other aspects of the access to such shared data, such as the status of the data, for example, shared or unique data and clean or dirty data.

The snoop control mechanisms are effective in controlling coherency, but suffer from the disadvantage of introducing additional overhead in the design, both in terms of circuit area, cost and energy consumption. Furthermore, it is also desirable to be able to connect transaction masters to coherent memory systems in circumstances where those transaction masters were not originally intended to operate within an environment where coherency control was necessary. Such legacy transaction masters typically will not include a local cache memory with coherency control mechanisms, such as the ability to respond and manage snoop requests. One possibility would be to add such a cache memory with a normal coherency capability to the transaction masters. However, this would represent a disadvantageous additional overhead, particularly when the transaction master does not have memory access requirements that otherwise justify the inclusion of such a cache memory permitting it to hold local copies of data values.

One way of addressing this problem is described in commonly assigned copending application No. U.S. Ser. No. 12/656,538 filed on 2 Feb. 2010 entitled Area and Power Efficient Data Coherency Maintenance.

SUMMARY OF THE INVENTION

Viewed from one aspect the present invention provides a memory interface apparatus comprising:

first interface circuitry configured to connect to transaction master circuitry;

second interface circuitry configured to connect to a memory system; and transaction control circuitry coupled to said first interface circuitry and said second interface circuitry and configured to:

receive from said transaction master circuitry via said first interface circuitry a first write request to write target data associated with a memory address within said memory system;

issue via said second interface circuitry a further transaction request associated with said memory address;

receive via said second interface circuitry an indication of completion of said further transaction request;

issue via said second interface circuitry a second write request to write at least said write target data to said memory system;

receive via said second interface circuitry a write response signal indicating said write target data has been written to said memory system; and in dependence upon receipt of said write response signal, issue an acknowledge signal via said second interface circuitry to said memory system indicating said indication of completion associated with said further transaction and said write response signal have been received.

The present technique recognises that the requirements for a transaction master to hold a local copy of data may be limited to a few circumstances and that these requirements may be addressed without the need to provide a cache memory capable of supporting standard coherency management. In particular, when a transaction master wishes to perform a write of a data value within such systems, it proceeds by issuing a transaction to establish the status of that data elsewhere within the system before it makes its write to that data. When the status of the data being accessed has been confirmed by this further transaction, such as, for example, by reading the most up-to-date copy of the data from the memory system or invalidating all previously clean versions of that data held elsewhere within the memory system, then the write request to that data may be issued to the memory system.

With this approach there is a problem that when the further transaction has completed and before the write transaction is issued and actioned by the memory system, then another part of the system may make an access to that memory address which conflicts and should not be permitted. Within a system where the transaction master has mechanisms for supporting snoop requests, this problem is dealt with by the transaction master storing a local copy of the data concerned such that if another portion of the system seeks to access that data, then the snoop request will indicate that this local copy exists and should be referenced. The present technique takes an alternative approach by issuing the further transaction to the memory address prior to issuing the write transaction, but delaying issuing an acknowledge signal to the memory system in respect of that further transaction even though it has completed, until after the write transaction has completed.

In this way, the memory system may track the further transaction and note that the transaction master is accessing that data so as to prevent other accesses to that data. This block on other accesses will be continued while the transaction master makes it write and until the transaction master eventually issues the acknowledge signal to indicate that it has received the indication of completion of the further transaction from the memory system. The extended duration of the further transaction which can be used by the other parts of the memory system which have a coherency management capability to ensure that the transaction master does not suffer any competing accesses to that data. In this way, it is possible to manage coherency without the need for the memory interface apparatus to itself support snoop requests.

The further transaction which is issued from the memory interface as part of the write operation and which has its duration extended by the delay of the issue of its acknowledge signal can take a variety of different forms. In some embodiments the further transaction may be a read request to read current data associated with the memory address from the memory system.

In such embodiments the indication of completion may be the receipt of a read response signal indicating that the current data has been supplied to the memory interface via the second interface circuitry. The indication of completion could take other forms not necessarily requiring the provision of a separate read response signal, such as noting the arrival of the read data signals themselves, or some timer based system.

When the further transaction is a read, then the transaction control circuitry may be configured to form updated data from the returned current data and the write target data with this updated data being stored within data storage circuitry within the memory interface apparatus prior to the updated data being written to the memory system by the second write request.

The data storage circuitry within the memory interface apparatus may take the form of a cache memory configured to store one or more lines of cache data. This cache memory need not support snooping, or other complex coherency control techniques, as it can benefit from the delay of the issue of the acknowledge signal in respect of the further transaction to manage coherency during a write operation from the transaction master.

Another possible form of the further transaction is an invalidate request to invalidate current data associated with the memory address and stored elsewhere within the memory system. In this context, the indication of completion may be an invalidation of completion signal returned to the memory interface apparatus indicating that the current data has been invalidated where it is stored elsewhere.

The coherent memory system may comprise a main memory and at least one cache memory configured to store local copies of data. Interconnect circuitry may connect the main memory and the at least one cache memory with coherency control circuitry being provided to control data coherency between data stored within the main memory and the at least one cache memory using snoop request signals.

A read request issued as the further transaction may take a form different from a standard read request. In some embodiments the read request may be such that the indication of completion which is returned includes an indication that the current data is not stored in any of the at least one cache memories elsewhere within the memory system. The current data need not be supplied to the second interface circuitry when such a response arises as the main memory can be responsible for any required merges of the updated data with the current data stored within the main memory.

Another form of completion indication that may be associated with the read request of the present techniques is that none of the at least one cache memory within the memory system is storing the current data as dirty data having a value different from the corresponding data stored within the memory, any copy of the data has been marked as invalid and that in this circumstance the current data is not supplied to the second interface circuitry. Again, the main memory may be responsible for merging any updated data with the current data when the second write request reaches the main memory.

The coherency control circuitry provided may be configured to detect the further transaction request issued to the memory system via the second interface circuitry and to stall any transaction requests later within a serialization order managed by the coherency control circuitry within the memory system to the memory address until the acknowledge signal is received from the memory interface apparatus via the second interface circuitry. In this case it is the coherency control circuitry which uses the delayed acknowledge signal to manage coherency control for the transaction master.

While the memory interface apparatus may be provided as a part of the transaction master, it is convenient in some embodiments that the memory interface apparatus is part of the interconnect circuitry such that the first interface circuitry is an interface between the interconnect circuitry and the transaction master circuitry. This is useful in supporting legacy transaction masters.

The memory interface apparatus using the delayed acknowledge signal provides a simplified technique for managing coherency associated with write requests such that no snoop request signals (e.g. a request from the memory system to the memory interface apparatus) need pass across the second interface circuitry and accordingly the complexity of the memory interface apparatus may be desirable reduced.

In some embodiments the memory interface apparatus may be provided with at least one further memory interface configured to connect to further transaction master circuitry. Thus, one memory interface apparatus may serve to connect multiple transaction masters to the memory system. In other embodiments multiple memory interface apparatuses may be provided within the system as a whole with each of these separate memory interface apparatuses serving to connect one or more transaction masters to the memory system.

The second write request may be processed by the memory system without any dependence upon the acknowledge signal as this helps ensure that no deadlocks or other pathological system states arise as a consequence of the delay of the acknowledge signal.

Viewed from another aspect the present invention provides an apparatus for processing data comprising:

a main memory;

at least one cache memory configured to store local copies of data stored within said main memory;

interconnect circuitry configured to connect said main memory and said at least one cache memory;

coherency control circuitry configured to control data coherency between data stored within said main memory and said at least one cache memory using snoop request signals; and memory interface apparatus having:

first interface circuitry configured to connect to transaction master circuitry;

second interface circuitry configured to connect to said interconnect circuitry; and transaction control circuitry coupled to said first interface circuitry and said second interface circuitry and configured to:

receive from said transaction master circuitry via said first interface circuitry a first write request to write target data associated with a memory address within at least one of said main memory and said at least one cache memory;

issue via said second interface circuitry a further transaction request associated with said memory address;

receive via said second interface circuitry an indication of completion of said further transaction request;

issue via said second interface circuitry a second write request to write at least said write target data;

receive via said second interface circuitry a write response signal indicating said write target data has been written; and in dependence upon receipt of said write response signal, issue an acknowledge signal via said second interface circuitry to said coherency control circuitry indicating said indication of completion associated with said further transaction and said write response signal have been received.

Viewed from a further aspect the present invention provides a memory interface apparatus comprising:

first interface means for connecting to transaction master means for generating a transaction;

second interface means for connecting to a memory system; and transaction control means coupled to said first interface means and said second interface means for:

receiving from said transaction master means via said first interface means a first write request to write target data associated with a memory address within said memory system;

issuing via said second interface means a further transaction request associated with said memory address;

receiving via said second interface means an indication of completion of said further transaction request;

issuing via said second interface means a second write request to write at least said write target data to said memory system;

receiving via said second interface means a write response signal indicating said write target data has been written to said memory system; and in dependence upon receipt of said write response signal, issuing an acknowledge signal via said second interface means to said memory system indicating said indication of completion associated with said further transaction and said write response signal have been received.

Viewed from a further aspect the present invention provides an apparatus for processing data comprising:

main memory means for storing data;

a plurality of cache memory means for storing local copies of data stored within said main memory means;

interconnect means for connecting said main memory means and said plurality of cache memory means;

coherency control means for controlling data coherency between data stored within said main memory means and said plurality of cache memory means using snoop request signals; and memory interface means for interfacing to said main memory means and said plurality of cache memory means, said memory interface means having:

first interface means for connecting to transaction master means for generating a transaction;

second interface means for connecting to said interconnect means; and transaction control means coupled to said first interface means and said second interface means for:

receiving from said transaction master means via said first interface means a first write request to write target data associated with a memory address within at least one of said main memory means and said plurality of cache memory means;

issuing via said second interface means a further transaction request associated with said memory address;

receiving via said second interface means an indication of completion of said further transaction request;

issuing via said second interface means a second write request to write at least said write target data;

receiving via said second interface means a write response signal indicating said write target data has been written; and in dependence upon receipt of said write response signal, issuing an acknowledge signal via said second interface means to said coherency control means indicating said indication of completion associated with said further transaction and said write response signal have been received.

Viewed from a further aspect the present invention provides a method of accessing a memory system via a memory interface apparatus having first interface circuitry configured to connect to transaction master circuitry and second interface circuitry configured to connect to a memory system, said method comprising the steps of:

receiving from said transaction master circuitry via said first interface circuitry a first write request to write target data associated with a memory address within said memory system;

issuing via said second interface means a further transaction request associated with said memory address;

receiving via said second interface means an indication of completion indicating completion of said further transaction request;

issuing via said second interface means a second write request to write at least said write target data to said memory system;

receiving via said second interface means a write response signal indicating said write target data has been written to said memory system; and in dependence upon receipt of said write response signal, issuing an acknowledge signal via said second interface means to said memory system indicating said indication of completion associated with said further transaction and said write response signal have been received.

Viewed from a further aspect the present invention provides a method controlling memory coherency within an apparatus for processing data having a main memory, at least one cache memory configured to store local copies of data stored within said main memory, interconnect circuitry configured to connect said main memory and said at least one cache memory, coherency control circuitry configured to control data coherency between data stored within said main memory and said at least one cache memory using snoop request signals and memory interface apparatus having first interface circuitry configured to connect to transaction master circuitry and second interface circuitry configured to connect to said interconnect circuitry; said method comprising the steps of:

receiving from said transaction master circuitry via said first interface circuitry a first write request to write target data associated with a memory address within at least one of said main memory and said at least one cache memory;

issuing via said second interface circuitry a further transaction request associated with said memory address;

receiving via said second interface circuitry an indication of completion indicating completion of said further transaction request;

issuing via said second interface circuitry a second write request to write at least said write target data;

receiving via said second interface circuitry a write response signal indicating said write target data has been written; and in dependence upon receipt of said write response signal, issuing an acknowledge signal via said second interface circuitry to said coherency control circuitry indicating said indication of completion associated with said further transaction and said write response signal have been received.

The above, and other objects, features and advantages of this invention will be apparent from the following detailed description of illustrative embodiments which is to be read in connection with the accompanying drawings.

DESCRIPTION OF THE EMBODIMENTS

Figure 1:
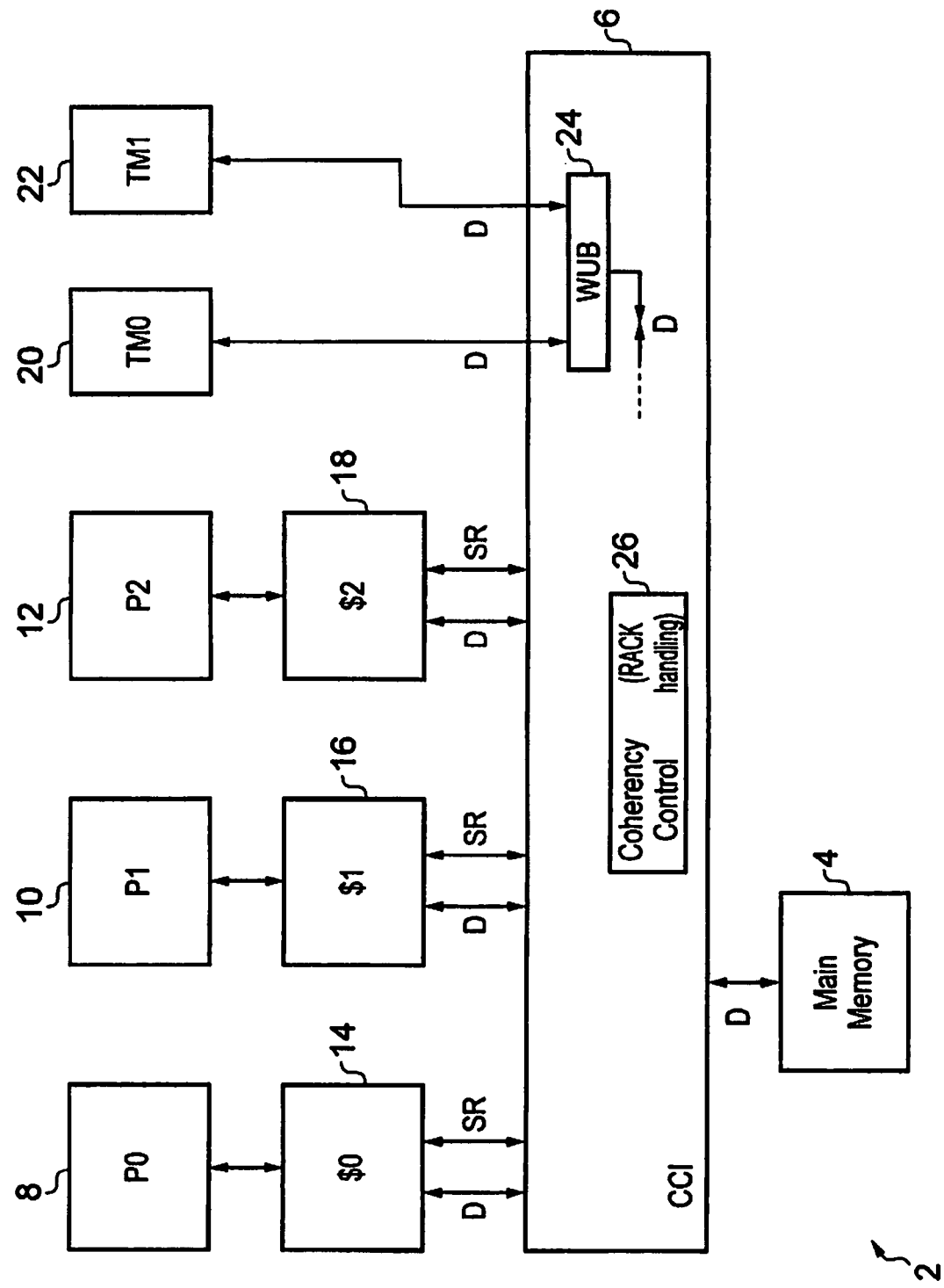
FIG. 1 schematically illustrates a data processing apparatus in a form such as is typical within system-on-chip integrated circuits supporting memory coherency mechanisms.

FIG. 1 schematically illustrates a data processing apparatus comprising a main memory 4, interconnect circuitry 6 and a plurality of processor cores 8, 10, 12, each with an associated cache memory 14, 16, 18 that supports coherency management mechanisms, such as snoop requests. Also connected to the interconnect circuitry 6 are two legacy transaction masters 20, 22. These legacy transaction masters 20, 22 both connect to memory interface apparatus in the form of a write unique buffer 24 (WUB). It is also possible that the transaction masters 20, 22 could each connect to their own separate write unique buffer. The write unique buffer 24, which serves as the memory interface apparatus, is disposed within the interconnect circuitry 6 such that a legacy transaction master 20, 22 can connect to the interconnect circuitry 6 without modification, and yet have its coherency for write requests managed. The interconnect circuitry 6 includes coherency control circuitry 26 which is responsible for issuing and responding to snoop request signals issued to and received from the cache memories 14, 16, 18.

The coherency control circuitry 26 also is responsive to the acknowledge signal RACK associated with a read request. This acknowledge signal RACK is returned from the transaction master 20, 22 which initiated a read to indicate that the read response has reached the requesting transaction master 20, 22. The coherency control circuitry 26 tracks to which memory addresses reads have been initiated and does not permit further transactions to be performed in respect of those memory addresses until the acknowledge signal RACK has been returned for the read request. A description of this normal behaviour of the acknowledge signal may be found in commonly assigned U.S. Pat. No. 7,757,027. The content of U.S. Pat. No. 7,757,027 is incorporated herein by reference in its entirety. The present techniques extend the use of the acknowledge signal RACK to also help in the coherency control associated with write requests from transaction masters connected via interfaces which do not support snoop requests.

When one of the processors 8, 10, 12 wishes to perform a write transaction it first ensures that it has the most up-to-date copy of that data stored within its local cache memory 14, 16, 18 and that the data is invalidated from all other caches in the system. This is achieved by snoop requests to the other cache memories 14, 16, 18 together with any necessary writebacks to clean dirty data. When the processor 8, 10, 12 is holding the most up-to-date copy of the data within its local cache memory 14, 16, 18, it performs the write to that data. If any other processor seeks to access the data concerned during or after the write is performed, then using the exchange of snoop requests and snoop responses, this other processor seeking to access the data will be appropriately managed such that it is returned the most up-to-date data or such that its own update to that data takes place after the first update has completed. These coherency management techniques associated with processors having cache memories supporting snoop access requests will be familiar to those in this technical field.

More problematic is the need to support write requests by transaction masters, such as legacy transaction masters 20, 22, which do not have an associated cache memory supporting coherency management mechanisms using snoop requests or other known coherency management techniques. The write unique buffer 24 which serves as a memory interface apparatus, serves the function of ensuring conformance with coherency requirements in respect of write requests as will be described below.

Figure 2:
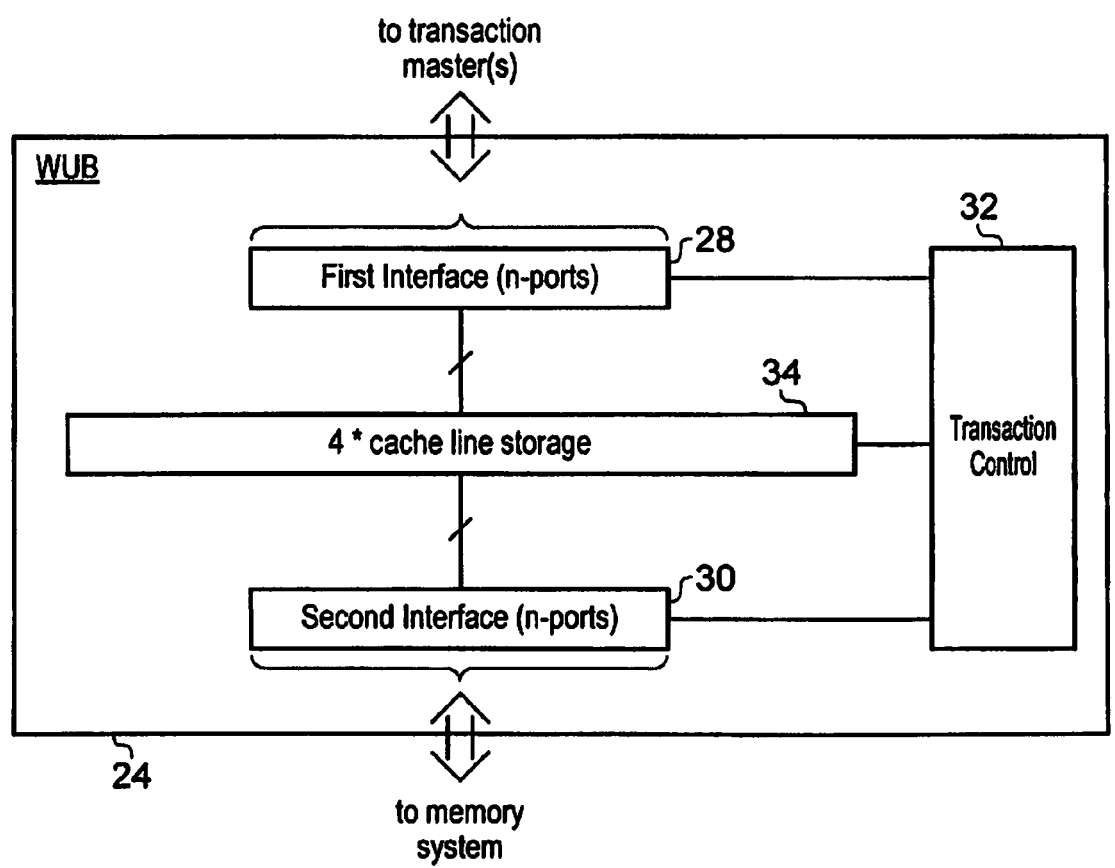
FIG. 2 schematically illustrates a memory interface apparatus.

FIG. 2 illustrates the write unique buffer 24 serving as the memory interface apparatus. The write unique buffer includes first interface circuitry 28, second interface circuitry 30, transaction control circuitry 32 and data storage circuitry 34 in the form of multiple cache lines forming a small cache memory. The first interface circuitry 28 connects to the transaction masters 20, 22. The second interface circuitry 30 connects to the rest of the memory system, which may be considered to be formed of the interconnect circuitry 6, the coherency control circuitry 26, the cache memories 14, 16, 18 and the main memory 4. Both the first interface circuitry 24 and the second interface circuitry 30 may have multiple ports.

Figure 3:
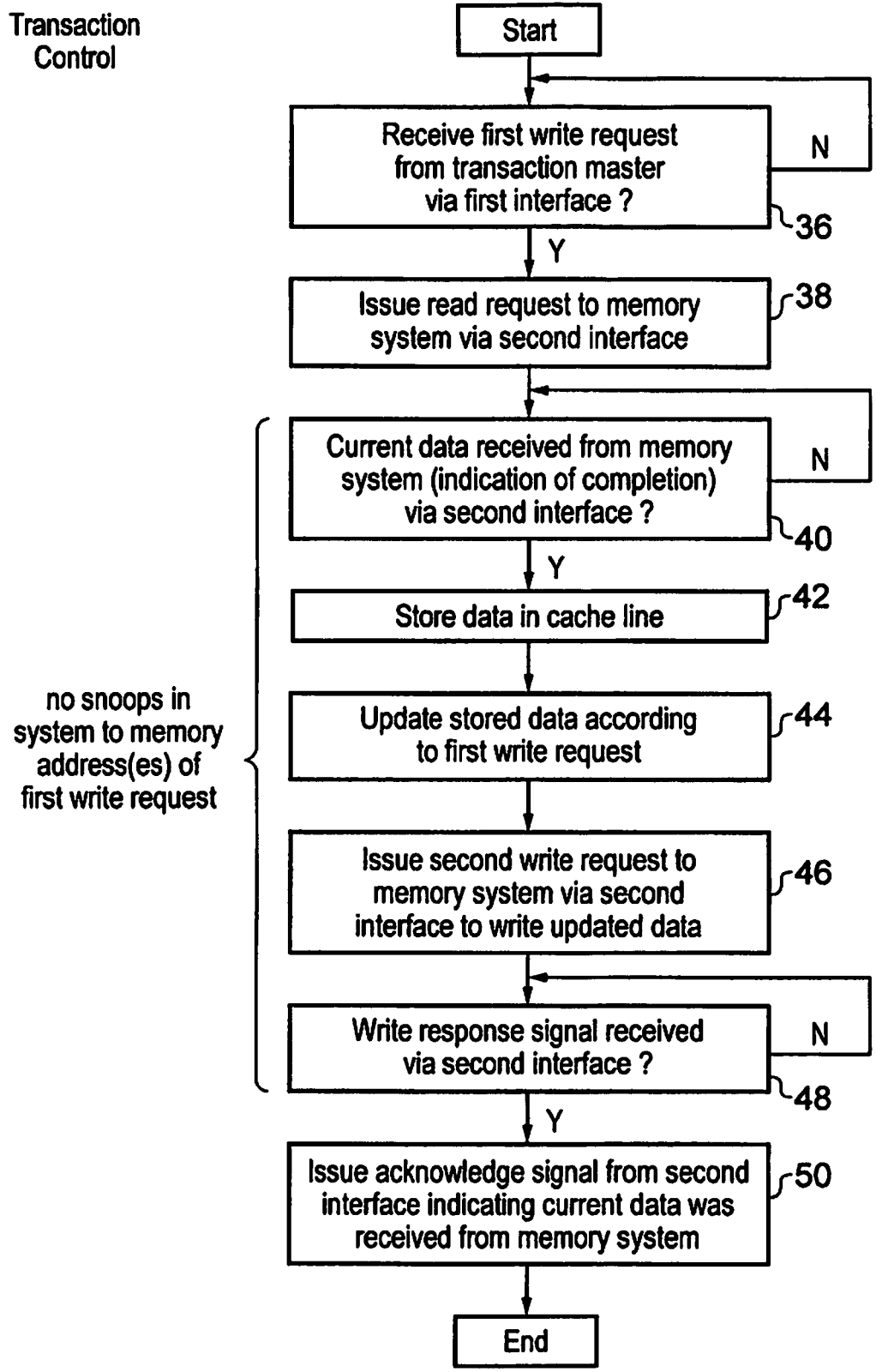
FIG. 3 is a flow diagram schematically illustrating transaction control associated with a write request within the memory interface apparatus of FIG. 2.

The transaction control circuitry 32 is configured to control the behaviour of the first interface circuitry 28, the second interface circuitry 30 and the data storage circuitry 34 to perform a write transaction in accordance with the processing schematically illustrated in the flow diagram of FIG. 3. In particular, at step 36 processing waits until a first write request is received from a transaction master 20, 22 via the first interface circuitry 28. When such a write request is received, then step 38 serves to issue a read request to the memory system 6, 26, 14, 16, 18, 4 to read the data associated with the memory address of the first write request and the further request is responsible for invalidating the other caches.

It will be appreciated that the memory address associated with the first write request may result in a block of data being returned to the write unique buffer 24. This block of data could correspond to a cache line in size and includes the individual memory address associated with the first write request. In this context, as the data is manipulated and managed in larger blocks than individual memory addresses, it may be that the memory addresses associated with the different requests and transactions of the subsequent processing of an individual request may vary, but nevertheless relate to the same block of memory. In this way, multiple memory addresses may be associated with a particular request and different absolute values of the memory address or different sequences of memory addresses may be generated as part of processing of the request concerned. These variations are encompassed within the present techniques.

Step 40 waits until the current data for the read request is returned from the memory system via the second interface circuitry 30 (the data for step 40 will not be returned until all the associated snoops have completed—however, in some embodiments this requirement may be relaxed). The return of the data is indicated by a read response signal (part of the AXI protocol referred to earlier) and in this example the read response signal constitutes the indication of completion of the read request (further transaction).

At step 42 the current data returned is stored into the data storage circuitry 34. At step 44 the data stored within the data storage circuitry 34 is updated in accordance with the first write request. This update may take the form of a merge or the overwriting of the data concerned.

It is possible that a different sequence may be adopted, such as the updated data being stored within the data storage circuitry 34 and then the current data merged into this stored data when it is returned in response to the read request. It is also possible in some embodiments that the data storage circuitry 34 need not be present and the data values returned merely held upon signal lines as valid data signals prior to being used to form the second write request. These variations are encompassed within the present techniques.

At step 46 the second write request is issued to the memory system 6, 26, 4 via the second interface circuitry 30 so as to write the updated data into the memory system. At step 48 processing waits until the write response signal is received via the second interface circuitry 30 corresponding to the second write request. Such write response signals are, in the example of the AXI protocol, given by the B channel signals referred to in this protocol.

After the write response signal has been received at step 48, i.e. in dependence upon the receipt of the write response signal, step 50 serves to issue an acknowledge signal RACK from the second interface circuitry 30 to the memory system 6, 26. This acknowledge signal RACK indicates completion of the further transaction (read request that was initiated at step 38) and that the write response was received at step 48. It will be appreciated that the normal time at which the acknowledge signal RACK would be generated in respect of the read request of step 38 is immediately following receipt of the current data at step 40. However, the present technique delays the return of the acknowledge signal RACK until after receipt of the write response signal at step 48. This ensures that in the time window encompassing steps 40, 42, 44, 46 and 48 no snoop requests will be generated within the data processing apparatus 2 to memory addresses associated with the write request as the coherency control circuitry 28 will already be tracking the read request issued at step 38 and will be able to determine that the acknowledge signal RACK for that read request has not yet been returned and accordingly other accesses (and their associated snoop requests) should be delayed until the acknowledge signal RACK has been returned.

Figure 4:
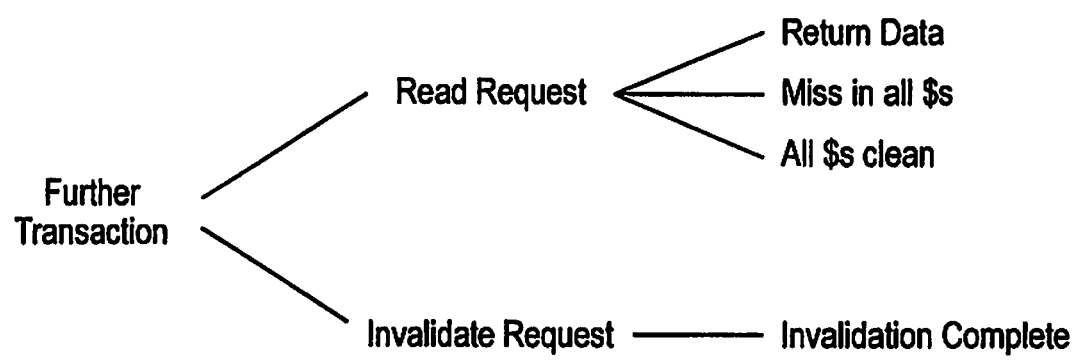
FIG. 4 schematically illustrates various options associated with the different possible forms of a further transaction request.

FIG. 4 schematically illustrates different possible forms that the further transaction associated with the write requests may take. In this example of FIG. 3, the further transaction is the read request issued at step 38. This read request may be a modified read request which in the case that the read misses in all of the cache memories 14, 16, 18 returns an indication of such misses and need not return the read data itself This saves energy as the read data need not be moved around the memory system. The main memory 4 includes mechanisms which permit the merging of updated data associated with the write request into lines of data corresponding to cache lines (e.g. byte or word strobes within the main memory 4 serving to control write operations of individual bytes or words). Another modified form of the read request may return a result indicating that none of the cache memories 14, 16, 18 stores a dirty version of the data concerned (i.e. a version different from the version currently stored within the main memory 4). In this case again the read data itself need not necessarily be returned and the main memory 4 can be responsible for merging the updated data into the line of data.

Another form of the further transaction is a clean and invalidate request. Such an invalidate request may be issued to the cache memories 14, 16, 18 to trigger them to invalidate any local copies they may store of the data concerned and perform any necessary writebacks if that data is dirty. When the invalidation has been performed, then an invalidation complete signal may be returned to the memory interface apparatus 24 as an indication of completion of the further transaction in the form of the invalidate request.

A further form of the further transaction is an invalidate request issued to the cache memories 14, 16, 18, to trigger them to invalidate any local copies of the data concerned. The invalidate requests that the line of data not be held in any other cache, but does not require any dirty data to be written to the main memory. This may be used when the associated write request is updating all of the bytes within the cache line concerned.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Memory interface apparatus comprising:
   first interface circuitry configured to connect to transaction master circuitry;
   second interface circuitry configured to connect to a memory system; and
   transaction control circuitry coupled to said first interface circuitry and said second interface circuitry and configured to:
   receive from said transaction master circuitry via said first interface circuitry a first write request to write target data associated with a memory address within said memory system;
   issue via said second interface circuitry a further transaction request associated with said memory address;
   receive via said second interface circuitry an indication of completion of said further transaction request;
   issue via said second interface circuitry a second write request to write at least said write target data to said memory system;
   receive via said second interface circuitry a write response signal indicating said write target data has been written to said memory system; and
   in dependence upon receipt of said write response signal, issue an acknowledge signal via said second interface circuitry to said memory system indicating said indication of completion associated with said further transaction request and said write response signal have been received.

2. Memory interface apparatus as claimed in claim 1, wherein said further transaction request is a read request to read current data associated with said memory address from said memory system.

3. Memory interface apparatus as claimed in claim 2, wherein said indication of completion is a read response signal indicating said current data has been supplied to said memory interface apparatus via said second interface circuitry.

4. Memory interface apparatus as claimed in claim 2, comprising data storage circuitry, wherein:
said transaction control circuitry is configured to:
form updated data from said current data and said write target data; and
store at least some of said updated data within said data storage circuitry; and
said second write request writes said updated data to said memory system.

5. Memory interface apparatus as claimed in claim 4, wherein said data storage circuitry is a cache memory configured to store at least one line of cache data including said target write data.

6. Memory interface apparatus as claimed in claim 1, wherein:
said further transaction request is an invalidate request to invalidate current data associated with said memory address and stored within said memory system; and
said indication of completion is an invalidation completion signal indicating said current data has been invalidated.

7. Memory interface apparatus as claimed in claim 1, wherein said memory system is a coherent memory system comprising: a main memory;
at least one cache memory configured to store local copies of data;
interconnect circuitry configured to connect said main memory and said at least one cache memory; and
coherency control circuitry configured to control data coherency between data stored within said main memory and said at least one cache memory using snoop request signals.

8. Memory interface apparatus as claimed in claim 7, wherein:
said further transaction request is a read request to read current data associated with said memory address from said memory system; and
said indication of completion includes an indication that said current data is not stored in any of said at least one cache memory and that said current data is not supplied to said second interface circuitry.

9. Memory interface apparatus as claimed in claim 7, wherein
said further transaction request is a read request to read current data associated with said memory address from said memory system; and
said indication of completion includes an indication that that none of said at least one cache memory is storing said current data as dirty data having a value different from corresponding data stored within said main memory, any copy of said data has been marked as invalid and that said current data is not supplied to said second interface circuitry.

10. Memory interface apparatus as claimed in claim 7, wherein said coherency control circuitry is configured to detect said further transaction request issued to said memory system via said second interface circuitry and to stall any transaction requests later within a serialization order managed by said coherency control circuitry within said memory system to said memory address until said acknowledge signal is received from said memory interface apparatus via said second interface circuitry.

11. Memory interface apparatus as claimed in claim 7, wherein said memory interface apparatus is part of said interconnect circuitry and said first interface circuitry is an interface between said interconnect circuitry and said transaction master circuitry.

12. Memory interface apparatus as claimed in claim 7, wherein no snoop request signals pass across said second interface circuitry.

13. Memory interface apparatus as claimed in claim 7, wherein said second write request is processed by said memory system without any dependence upon said acknowledge signal.

14. Memory interface apparatus as claimed in claim 1, comprising at least one further memory interface configured to connect to further transaction master circuitry.

15. Memory interface apparatus as claimed in claim 1, wherein said second write request is processed by said memory system without any dependence upon said acknowledge signal.

16. Apparatus for processing data comprising:
a main memory;
at least one cache memory configured to store local copies of data stored within said main memory;
interconnect circuitry configured to connect said main memory and said at least one cache memory;
coherency control circuitry configured to control data coherency between data stored within said main memory and said at least one cache memory using snoop request signals; and
memory interface apparatus having:
first interface circuitry configured to connect to transaction master circuitry;
second interface circuitry configured to connect to said interconnect circuitry; and
transaction control circuitry coupled to said first interface circuitry and said second interface circuitry and configured to:
receive from said transaction master circuitry via said first interface circuitry a first write request to write target data associated with a memory address within at least one of said main memory and said at least one cache memory;
issue via said second interface circuitry a further transaction request associated with said memory address;
receive via said second interface circuitry an indication of completion of said further transaction request;
issue via said second interface circuitry a second write request to write at least said write target data;
receive via said second interface circuitry a write response signal indicating said write target data has been written; and
in dependence upon receipt of said write response signal, issue an acknowledge signal via said second interface circuitry to said coherency control circuitry indicating said indication of completion associated with said further transaction request and said write response signal have been received.

17. Apparatus as claimed in claim 16, wherein said further transaction request is a read request to read current data associated with said memory address from said memory system.

18. Apparatus as claimed in claim 16, wherein:
said further transaction request is an invalidate request to invalidate current data associated with said memory address and stored within said memory system; and
said indication of completion is an invalidation completion signal indicating said current data has been invalidated.

19. Apparatus as claimed in claim 16, wherein:
said further transaction request is a read request to read current data associated with said memory address from said memory system; and
said indication of completion includes an indication that said current data is not stored in any of said at least one cache memory and that said current data is not supplied to said second interface circuitry.

20. Apparatus as claimed in claim 16, wherein:
said further transaction request is a read request to read current data associated with said memory address from said memory system; and
said indication of completion includes an indication that that none of said at least one cache memory is storing said current data as dirty data having a value different from corresponding data stored within said main memory, any copy of said data has been marked as invalid and that said current data is not supplied to said second interface circuitry.

21. Apparatus as claimed in claim 16, wherein said coherency control circuitry is configured to detect said further transaction request issued to said memory system via said second interface circuitry and to stall any transaction requests later within a serialization order managed by said coherency control circuitry within said memory system to said memory address until said acknowledge signal is received from said memory interface apparatus via said second interface circuitry.

22. Apparatus as claimed in claim 16, wherein said memory interface apparatus is part of said interconnect circuitry and said first interface circuitry is an interface between said interconnect circuitry and said transaction master circuitry.

23. Apparatus as claimed in claim 16, wherein no snoop request signals pass across said second interface.

24. Apparatus as claimed in claim 16, wherein said memory interface apparatus comprises at least one further first interface circuitry configured to connect to further transaction master circuitry.

25. Apparatus as claimed in claim 16, comprising further memory interface apparatus configured to connect to further transaction master circuitry.

26. Memory interface apparatus comprising:
first interface means for connecting to transaction master means for generating a transaction;
second interface means for connecting to a memory system; and
transaction control means coupled to said first interface means and said second interface means for:
receiving from said transaction master means via said first interface means a first write request to write target data associated with a memory address within said memory system;
issuing via said second interface means a further transaction request associated with said memory address;
receiving via said second interface means an indication of completion of said further transaction request;
issuing via said second interface means a second write request to write at least said write target data to said memory system;
receiving via said second interface means a write response signal indicating said write target data has been written to said memory system; and
in dependence upon receipt of said write response signal, issuing an acknowledge signal via said second interface means to said memory system indicating said indication of completion associated with said further transaction request and said write response signal have been received.

27. Apparatus for processing data comprising:
main memory means for storing data;
a plurality of cache memory means for storing local copies of data stored within said main memory means;
interconnect means for connecting said main memory means and said plurality of cache memory means;
coherency control means for controlling data coherency between data stored within said main memory means and said plurality of cache memory means using snoop request signals; and
memory interface means for interfacing to said main memory means and said plurality of cache memory means, said memory interface means having:
first interface means for connecting to transaction master means for generating a transaction;
second interface means for connecting to said interconnect means; and
transaction control means coupled to said first interface means and said second interface means for:
receiving from said transaction master means via said first interface means a first write request to write target data associated with a memory address within at least one of said main memory means and said plurality of cache memory means;
issuing via said second interface means a further transaction request associated with said memory address;
receiving via said second interface means an indication of completion of said further transaction request;
issuing via said second interface means a second write request to write at least said write target data;
receiving via said second interface means a write response signal indicating said write target data has been written; and
in dependence upon receipt of said write response signal, issuing an acknowledge signal via said second interface means to said coherency control means indicating said indication of completion associated with said further transaction request and said write response signal have been received.

28. A method of accessing a memory system via a memory interface apparatus having first interface circuitry configured to connect to transaction master circuitry and second interface circuitry configured to connect to a memory system, said method comprising the steps of:
receiving from said transaction master circuitry via said first interface circuitry a first write request to write target data associated with a memory address within said memory system;
issuing via said second interface means a further transaction request associated with said memory address;
receiving via said second interface means an indication of completion indicating completion of said further transaction request;
issuing via said second interface means a second write request to write at least said write target data to said memory system;

receiving via said second interface means a write response signal indicating said write target data has been written to said memory system; and in dependence upon receipt of said write response signal, issuing an acknowledge signal via said second interface means to said memory system indicating said indication of completion associated with said further transaction request and said write response signal have been received.

29. A method controlling memory coherency within an apparatus for processing data having a main memory, at least one cache memory configured to store local copies of data stored within said main memory, interconnect circuitry configured to connect said main memory and said at least one cache memory, coherency control circuitry configured to control data coherency between data stored within said main memory and said at least one cache memory using snoop request signals and memory interface apparatus having first interface circuitry configured to connect to transaction master circuitry and second interface circuitry configured to connect to said interconnect circuitry; said method comprising the steps of:

receiving from said transaction master circuitry via said first interface circuitry a first write request to write target data associated with a memory address within at least one of said main memory and said at least one cache memory;

issuing via said second interface circuitry a further transaction request associated with said memory address;

receiving via said second interface circuitry an indication of completion indicating completion of said further transaction request;

issuing via said second interface circuitry a second write request to write at least said write target data;

receiving via said second interface circuitry a write response signal indicating said write target data has been written; and in dependence upon receipt of said write response signal, issuing an acknowledge signal via said second interface circuitry to said coherency control circuitry indicating said indication of completion associated with said further transaction request and said write response signal have been received.

* * * * *